US009008552B2

(12) United States Patent
Watanabe et al.

(10) Patent No.: US 9,008,552 B2
(45) Date of Patent: Apr. 14, 2015

(54) CHARGING MEMBER AND ELECTROPHOTOGRAPHIC APPARATUS

(75) Inventors: Hiroaki Watanabe, Odawara (JP); Masaaki Harada, Yokohama (JP); Keiji Nose, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/238,292

(22) PCT Filed: Aug. 7, 2012

(86) PCT No.: PCT/JP2012/004997
§ 371 (c)(1), (2), (4) Date: Feb. 11, 2014

(87) PCT Pub. No.: WO2013/024577
PCT Pub. Date: Feb. 21, 2013

(65) Prior Publication Data

US 2014/0205323 A1 Jul. 24, 2014

(30) Foreign Application Priority Data

Aug. 12, 2011 (JP) ................................ 2011-176754

(51) Int. Cl.
*G03G 15/02* (2006.01)
*F16C 13/00* (2006.01)

(52) U.S. Cl.
CPC ........... *G03G 15/02* (2013.01); *G03G 15/0233* (2013.01)

(58) Field of Classification Search
USPC ......... 399/115, 168, 174, 176; 492/48, 53, 56
See application file for complete search history.

(56) References Cited

U.S. PATENT DOCUMENTS 8,235,879 B2 * 8/2012 Tsuchiya et al. ................ 492/56
8,275,292 B2 * 9/2012 Tomari et al. ................. 399/176

FOREIGN PATENT DOCUMENTS

| | | | |
|---|---|---|---|
| JP | 9-309975 | A | 12/1997 |
| JP | 2000-267394 | A | 9/2000 |
| JP | 2000-336212 | A | 12/2000 |
| JP | 2011-017934 | A | 1/2011 |
| JP | 2012-008321 | A | 1/2012 |
| WO | 97/43698 | A1 | 11/1997 |

* cited by examiner

*Primary Examiner* — Hoan Tran
(74) *Attorney, Agent, or Firm* — Canon USA, Inc. IP Division

(57) ABSTRACT

The present invention provides a charging member which has a low compression set and which can suppress the generation of image defects.
A layer of an unvulcanized rubber composition including an unvulcanized acrylonitrile butadiene rubber and N,N'-methylenebis(1,4-phenylene)dimaleimide is vulcanized.

4 Claims, 2 Drawing Sheets

CHARGING MEMBER AND ELECTROPHOTOGRAPHIC APPARATUS

TECHNICAL FIELD

The present invention relates to a charging member and an electrophotographic apparatus.

BACKGROUND ART

In recent years, in an electrophotographic apparatus, such as a copying machine or an optical printer, as a charging method for charging a photoconductor, a dielectric body, or the like, a direct charging method has been employed. The direct charging method is a charging method in which a member (charging member) is placed close to or is brought into contact with a surface of a drum-shaped electrophotographic photoconductor to charge the surface thereof by voltage application. In general, in operation, a rubber roller-type charging member (hereinafter referred to as "charging roller") formed of a conductive support and a conductive elastic layer provided thereon is pressed against a photoconductor while being rotated.

In such a charging roller, in order to uniformly charge the photoconductor, it is required to ensure a uniform contact of the roller with the photoconductor in a roller axis direction. However, when the charging roller is pressure-pressed against the photoconductor for a long period of time, deformation which is not easily recovered, that is, a compression set (hereinafter also simply referred to as "C set"), is generated at a part of the charging roller in some cases.

When a charging roller on which a C set is generated is used for contact charging, and a part thereof at which the compression set is generated passes a nip portion formed with a photoconductor drum, discharge generated in a space between the surface of the charging roller and the surface of the photoconductor drum is destabilized. As a result, charging irregularities are generated on the photoconductor drum, and defects, such as stripes, are generated in an electrophotographic image in some cases.

PTL 1 has disclosed a method for forming a low friction surface layer having a high hardness on a surface of an elastic layer by adding an additive of a fluorine-based block copolymer or a silicone-based block copolymer to a binder.

CITATION LIST

Patent Literature

PTL 1: Japanese Patent Laid-Open No. 2000-267394

SUMMARY OF INVENTION

Technical Problem

However, concomitant with recent improvement of electrophotographic techniques in process speed and fineness of image quality, even if a very low C set is generated in the charging member, by the method disclosed in the PTL 1, the generation of lateral stripe defects in an electrophotographic image caused by the above C set may not be prevented in some cases. Hereinafter, an electrophotographic image having stripe defects caused by the C set is also called a "C set image".

Accordingly, the present invention provides a charging member which can more reliably suppress the generation of the C set image.

In addition, the present invention also provides an electrophotographic apparatus which can stably form a high quality electrophotographic image.

Solution to Problem

According to the present invention, there is provided a charging member having a conductive elastic layer which is formed by vulcanizing a layer of an unvulcanized rubber composition including an unvulcanized acrylonitrile butadiene rubber and N,N'-methylenebis(1,4-phenylene)dimaleimide.

In addition, according to the present invention, there is provided an electrophotographic apparatus including the charging member described above and an electrophotographic photoconductor.

Advantageous Effects of Invention

According to the present invention, there is obtained a charging member which has a low compression set even if being used for a long period of time and which can be used to stably form a high quality electrophotographic image.

DESCRIPTION OF EMBODIMENTS

Figure 1:
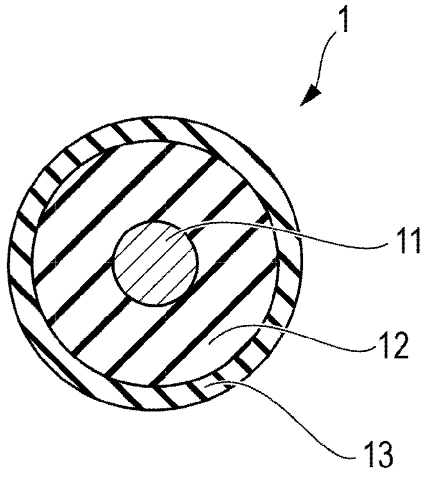
FIG. 1 is a cross-sectional view of a charging roller according to the present invention.

Hereinafter, a charging roller according to the present invention will be described with reference to FIG. 1. A charging roller 1 is formed of a core metal 11 and an elastic layer 12 provided around the periphery thereof and, if needed, may have a surface layer 13 around the periphery of the elastic layer 12.

Elastic Layer

The elastic layer 12 includes a vulcanized rubber. The vulcanized rubber is formed by vulcanizing a composition including an unvulcanized acrylonitrile butadiene rubber and N,N'-methylenebis(1,4-phenylene)dimaleimide represented by the following structural formula (1).

[Chem.1]

STRUCTURAL FORMULA (1)

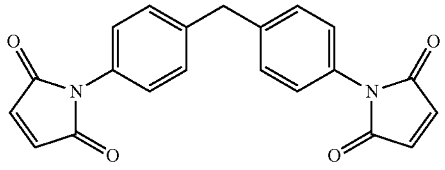

In general, a pressure from a photoconductor is most greatly applied to the surface of the charging roller. Hence, it is believed that in order to suppress the compression set, an increase in crosslinking density of the surface layer is effective. However, in a process of forming the surface layer, it is considered that since crosslinking of a binder polymer and molecular dissociation thereof caused by heat generated in crosslinking or the like competitively occur, the crosslinking density of the surface layer cannot be sufficiently increased in some cases.

On the other hand, in the present invention, it is also considered that when polymer radicals generated by the molecular dissociation in the vicinity of the surface are allowed to react with double bonds of the compound represented by the above structural formula (1) so that the generated polymer radicals are again crosslinked, the decrease in molecular weight caused by the molecular dissociation of the binder polymer by heating can be suppressed. That is, the surface layer according to the present invention has, besides the crosslinking structure formed by common sulfur vulcanization, a crosslinking structure between binder polymer molecular chains formed by the above maleimide compound, and hence, the crosslinking structure of the surface layer is highly advanced. As a result, the charging member according to the present invention can further reduce the compression set and the generation of image defects caused thereby.

In the present invention, if needed, the composition may contain at least one other polymer besides the acrylonitrile butadiene rubber. As a guide of the amount of the other polymer to be contained, when the total polymer amount is set to 100 parts by mass, the mass ratio of the acrylonitrile butadiene rubber to the other polymer is preferably set in a range of 100:0 to 40:60. As particular examples of the other polymer, for example, there may be mentioned a natural rubber (NR), an isoprene rubber (IR), a butadiene rubber (BR), a styrene-butadiene rubber (SBR), a butyl rubber (IIR), an epichlorohydrin homopolymer (CHC), a chloroprene rubber (CR), and an acryl rubber (ACM, or ANM).

In the present invention, if needed, the composition contains an electron conductive filler as conductive particles. As particular examples of the electron conductive filler, for example, carbon blacks may be mentioned. The amount of carbon black to be contained may be adjusted so that the electrical resistance of the elastic layer has a desired value. As a guide of the amount of carbon black to be contained, 30 to 70 parts by mass thereof is used with respect to 100 parts by mass of the total polymer. The types of carbon blacks to be contained are not particularly limited. As particular examples of the carbon blacks, for example, there may be mentioned gas furnace black, oil furnace black, thermal black, lamp black, acetylene black, and ketjen black.

Furthermore, if needed, for example, a filler, a processing aid, a cross-linking auxiliary agent, a cross-linking accelerator, a cross-linking accelerator activator, a cross-linking retarder, a softening agent, a plasticizer, and/or a dispersant, which are commonly used as compounding agents for rubbers, may be added to the composition. As methods for mixing these raw materials, for example, they may be mentioned a mixing method which uses a closed mixing machine, such as a Banbury mixer or a pressure kneader, and a mixing method which uses an open mixing machine, such as an open roll machine.

The elastic layer may be formed, for example, by the following method.

An unvulcanized rubber roller is formed by laminating the rubber composition described above on a conductive support (core metal). As a method for forming a rubber roller, a method may be mentioned in which an elastic-layer rubber composition is formed into a tube by extrusion, and the core metal is inserted into the tube. In addition, there may also be mentioned a method in which an unvulcanized rubber composition is co-extruded with the core metal provided at the center into a cylindrical shape by an extruder equipped with a crosshead to obtain a molded body having a desired outer diameter. Furthermore, another method may also be mentioned in which an unvulcanized rubber composition is injected into a mold having a desired outer diameter by an injection machine to obtain a molded body. Among those methods mentioned above, an extrusion molding method using an extruder equipped with a crosshead is most preferable since continuous production can be easily performed, the number of steps is small, and a low-cost production is suitably performed.

Next, the molded unvulcanized rubber roller is vulcanized to form a vulcanized rubber roller. Vulcanization is performed by a heat treatment, and as the heat treatment method, for example, hot-air oven heating using a gear oven, superheating vulcanization by far infrared rays, and steam heating using a vulcanizing can may be mentioned. Among those methods mentioned above, hot-air oven heating and far infrared-ray superheating are preferable since continuous production can be performed.

Subsequently, the surface of the vulcanized rubber roller may be further processed by a polishing treatment. As a method for polishing the surface of the roller, for example, there may be mentioned a transverse polishing method in which the surface of the roller is polished by moving a grinding stone or the roller in a thrust direction thereof. In addition, there may also be mentioned a plunge-cut polishing method in which while the roller is rotated around the core metal axis, a grinding stone having a width longer than the roller length is cut into the roller without reciprocating the grinding stone. The plunge-cut cylindrical polishing method is more preferable since the whole width of the elastic roller can be polished once, and the processing time can be shortened as compared to that of the transverse cylindrical polishing method.

In addition, in an extrusion molding method using the extruder equipped with a crosshead, when a feed speed of the core metal supplied from a core metal feeding device is continuously changed, a roller having a crown shape can be formed. That is, the feed speed is being decreased after the front end of the core metal passes a dice outlet and until the central portion of the core metal passes the dice outlet, and the feed speed is being increased after the central portion of the core metal passes the dice outlet and until the rear end of the core metal passes the dice outlet. By this adjustment of the core-metal feed speed, an elastic layer having a crown shape is formed in which the diameter of the roller at the central portion is larger in a radial direction than that of the roller at each end.

In order to suppress adhesion of dust, such as toner and paper powders, to the surface of the charging member, the surface of the elastic layer may be modified by performing ultraviolet irradiation, electron beam irradiation, or the like, or a surface layer may be formed so as to cover a circumferential surface of the elastic layer.

Electron Beam Irradiation Device

Figure 2:
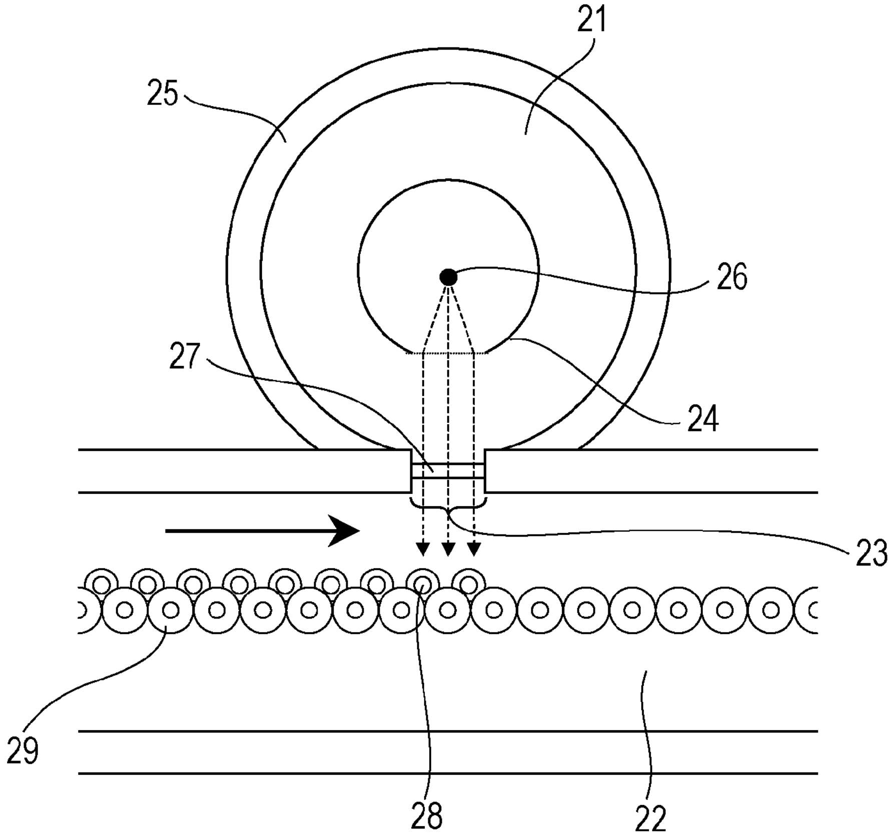
FIG. 2 is a view illustrating an electron beam irradiation device.

FIG. 2 is a schematic view of an electron beam irradiation device.

An electron beam irradiation device used in the present invention irradiates the surface of the roller with electron beams while the roller is rotated and has an electron beam generation portion 21, an irradiation room 22, and an irradiation port 23 as shown in FIG. 2.

The electron beam generation portion 21 has a terminal 24 which generates electron beams and an accelerating tube 25 which accelerates electron beams generated by the terminal 24 in a vacuum space (acceleration space). In addition, in order to prevent electrons from losing their energy through collision with gas molecules, the inside of the electron beam generation portion is maintained in a vacuum state in a pressure range of $10^{-3}$ to $10^{-6}$ Pa, for example, by a vacuum pump (not shown). When heating is performed by passing a current through a filament 26 by a power source (not shown), the filament 26 emits hot electrons, and among the hot electrons thus emitted, hot electrons passing through the terminal 24 are effectively extracted as electron beams. In addition, after being accelerated by an acceleration voltage of electron beams in the acceleration space in the accelerating tube 25, the electron beams pass through an irradiation port foil 27 and irradiate rubber rollers 28 conveyed in the irradiation room 22 located below the irradiation port 23.

When the rubber rollers 28 are irradiated with electron beams, the inside of the irradiation room 22 is placed in a nitrogen atmosphere. In addition, the rubber rollers 28 are conveyed from a left side to a right side in the irradiation room as shown in FIG. 2 by a conveyor unit while being rotated by roller rotation members 29. In addition, lead shielding (not shown) is provided along the periphery of the electron beam generation portion 21 and that of the irradiation room 22 so as to prevent x-rays which are secondarily generated in the electron beam irradiation from leaking outside.

The irradiation port foil 27 is formed of a metal foil and functions to separate a vacuum atmosphere in the electron beam generation portion from an air atmosphere in the irradiation room, and electron beams are extracted into the irradiation room through the irradiation port foil 27. Hence, the irradiation port foil 27 provided at the boundary between the electron beam generation portion 21 and the irradiation room 22 preferably has no pin holes and a mechanical strength to sufficiently maintain a vacuum atmosphere in the electron beam generation portion and preferably allows electron beams to easily pass therethrough. Accordingly, the irradiation port foil 27 preferably has a low specific gravity and is formed of a thin metal, and in general, an aluminum or a titanium foil is used.

Effect process conditions by electron beams are determined by the acceleration voltage and exposure dosage of electron beams. The acceleration voltage has an influence on the depth of hardening process, and as a guide of the acceleration voltage in the present invention, a low energy region, such as in a range of 40 to 300 kV, is preferable, and in particular, a range of 80 to 150 kV is more preferable. When the acceleration voltage is set in the above range, the device cost can be suppressed low without increasing the size of the electron beam irradiation device, and in addition, a sufficient depth of hardening process can be obtained so as to obtain the effect of the present invention. The exposure dosage of electron beams in electron beam irradiation is defined by the following formula (1).

[Math.1]

$$D=(K\cdot I)/V \quad (1)$$

In the above formula, D indicates an exposure dosage (kGy), K indicates a device constant, I indicates an electron current (mA), and V indicates a process speed (m/min). The device constant K is a constant indicating the efficiency of each device and is an index of device performance. The device constant K can be obtained when the exposure dosage is measured at a predetermined acceleration voltage by changing the electron current and the process speed. The measurement of exposure dosage of electron beams can be performed in such a way that a film for exposure dosage measurement is adhered on the surface of the roller, is then actually processed by the electron beam irradiation device, and is finally measure by a film dose meter. In the present invention, the film used for exposure dosage measurement is "FWT-60U" (trade name, manufactured by Far West Technology), and the film dose meter is "FWT-92D type" (trade name, manufactured by Far West Technology).

The conductive rubber elastic layer according to the present invention may also be used, for example, as a developing member, a transfer member, a charge-removing member, and a conveyor member, such as a paper feed roller, besides the elastic layer of the charging roller.

Electrophotographic Apparatus

Figure 3:
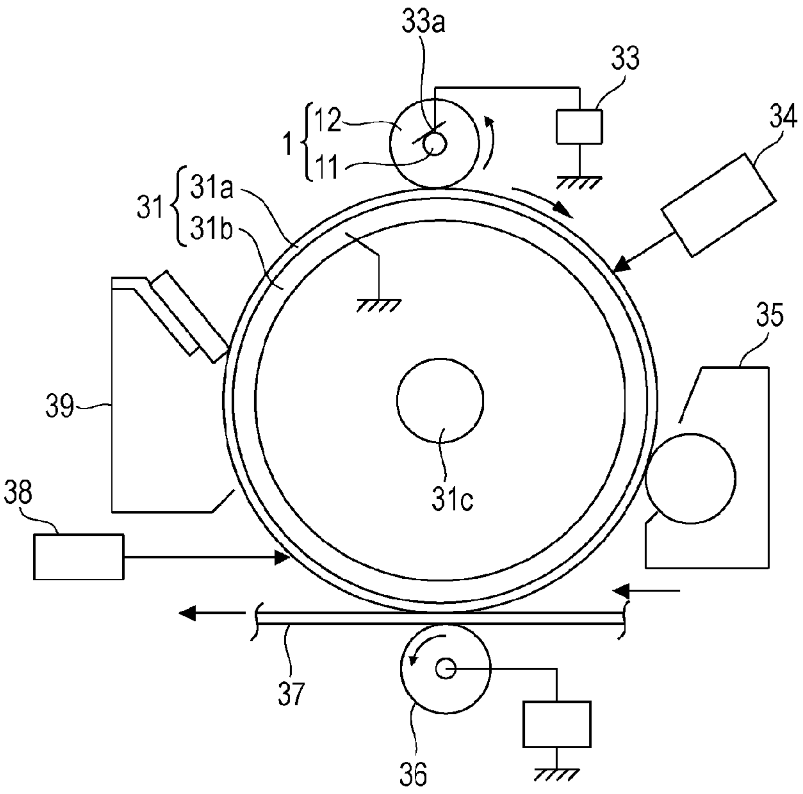
FIG. 3 is a structural view showing an electrophotographic apparatus using a charging member according to the present invention.

FIG. 3 is a cross-sectional view showing an electrophotographic apparatus including the charging member according to the present invention. An electrophotographic photoconductor 31 is a drum-shaped electrophotographic photoconductor including, as basic structural layers, a conductive support 31*b* of aluminum or the like having conductivity and a photoconductor layer 31*a* formed on the conductive support 31*b*. The electrophotographic photoconductor 31 is rotary-driven around an axis 31*c* at a predetermined circumferential speed in a clock-wise direction shown in the figure.

The charging roller 1 according to the present invention is pressed against the electrophotographic photoconductor 31 by a press unit (not shown) provided at the two ends of the core metal 11. In addition, when the electrophotographic photoconductor 31 is rotated by a drive unit (not shown), the charging roller 1 is follow-up rotated with the rotation of the electrophotographic photoconductor 31. When a predetermined direct current (DC) bias is applied to the core metal 11 by a power source 33 through a sliding contact power source 33*a*, the electrophotographic photoconductor 31 is charged to have a predetermined polarity and a predetermined potential.

The circumferential surface of the electrophotographic photoconductor 31 charged by the charging roller 1 is then subjected to exposure (laser beam scanning exposure, slit exposure of an original image, or the like) of desired image information using an exposure unit 34, and an electrostatic latent image corresponding to the desired image information is formed on the circumferential surface.

The electrostatic latent image is sequentially visualized as a toner image by a developing member 35. This toner image is then sequentially transferred by a transfer roller 36 to a transfer member 37 which is conveyed from a paper feed unit (not shown) to a transfer portion located between the electrophotographic photoconductor 31 and the transfer roller 36 at an appropriate timing in synchronization with the rotation of the electrophotographic photoconductor 31.

The transfer member 37 which receives the transfer of the toner image on its surface is separated from the electrophotographic photoconductor 31, is then conveyed to a fixing unit (not shown) for image fixation, and is finally output as an image forming material. Alternatively, when an image is also formed on a rear surface of the transfer member, the transfer member is conveyed to a re-conveyor unit for the transfer portion. After the image is transferred, from the circumferential surface of the electrophotographic photoconductor 31, a charge remaining on the electrophotographic photoconductor drum is removed (charge removal) by pre-exposure using a pre-exposure unit 38. For this pre-exposure unit 38, a known unit may be used, and for example, an LED chip array, a fuse lamp, a halogen lamp, and a fluorescent lamp are preferably mentioned.

The circumferential surface of the electrophotographic photoconductor 31 thus charge-removed is washed and cleaned by a cleaning member 39 which removes adhesive contaminants, such as a toner remaining on the above surface, so that the electrophotographic photoconductor 31 is repeatedly used for image formation.

The charging roller 1 may be follow-up driven to the electrophotographic photoconductor 31 which is driven with surface movement, may be not rotated, or may be positively rotary driven at a predetermined circumferential speed in a direction along the surface movement direction of the electrophotographic photoconductor 31 or in a direction opposite thereto.

In addition, when the electrophotographic apparatus is used as a copying machine, the exposure is performed in such a way that by using reflection light from or transmission light through a manuscript, the manuscript is converted into a reading signal, and based on this signal, for example, a laser beam is scanned, or an LED array is driven. As an electrophotographic apparatus which can use the conductive rubber elastic body according to the present invention, for example, there may be mentioned a copying machine, a laser beam printer, an LED printer, and an electrophotographic applied device, such as an electrophotographic plate making system.

EXAMPLES

Hereinafter, the present invention will be described in detail with reference to the following examples. In the examples, "part(s)" indicates "part(s) by mass" unless otherwise particularly noted, and high purity commercially available substances are used as reagents and the like unless otherwise particularly specified.

Example 1

Preparation of Elastic-Layer Rubber Material

Materials listed in Table 1 were mixed together at a filling rate of 70 percent by volume in a 6-liter pressure kneader (trade name: TD6-15MDX, manufactured by Toshin Co., Ltd.) and at a blade rotation speed of 30 rpm for 12 minutes, so that an A-kneaded rubber compound was obtained.

TABLE 1

| | |
|---|---|
| ACRYLONITRILE BUTADIENE RUBBER (NBR) (TRADE NAME: N230SV, CONTENT OF ACRYLONITRILE: 35%, MANUFACTURED BY JSR CORP.) | 100 PARTS BY MASS |
| ZINC STEARATE (TRADE NAME: ZINC STEARATE, MANUFACTURED BY NOF CORP.) | 1 PART BY MASS |
| ZINC OXIDE (TRADE NAME: ZINC FLOWER CLASS 2, MANUFACTURED BY Sakai Chemical Industry Co., Ltd.) | 5 PARTS BY MASS |
| CALCIUM CARBONATE (TRADE NAME: SILVER W, MANUFACTURED BY Shiraishi Kogyo Kaisha, Ltd.) | 20 PARTS BY MASS |
| CARBON BLACK (TRADE NAME: Raven 1000, MANUFACTURED BY Evonik Degussa) | 30 PARTS BY MASS |
| N,N'-METHYLENEBIS (1,4-PHENYLENE) DIMALEIMIDE | 3 PARTS BY MASS |

With 159 parts by mass of this A-kneaded rubber compound, materials listed in Table 2 were mixed at a front-roll rotation speed of 8 rpm and a rear-roll rotation speed of 10 rpm with a roll gap of 2 mm for 20 minutes using open rolls each having a diameter of 12 inches, so that an elastic-layer unvulcanized rubber composition was obtained.

TABLE 2

| | |
|---|---|
| SULFUR (TRADE NAME: SULFAX PMC, MANUFACTURED BY Tsurumi Chemical Industry Co., Ltd.) | 1.2 PARTS BY MASS |
| VULCANIZATION ACCELERATOR Tetrabenzylthiuram monosulfide (TRADE NAME: NOCCELER TBzTD, MANUFACTURED BY Ouchi Shinko Chemical Industrial Co., Ltd.) | 4.5 PARTS BY MASS |

Formation of Charging Roller

A conductive vulcanizing adhesive (METALOC U-20, manufactured by Toyokagaku Kenkyusho Co., Ltd.) was applied on a cylindrical surface of a cylindrical conductive support at a central portion having a length of 228 mm in an axial direction and was then dried at 80 degrees Celsius for 30 minute, and the above cylindrical conductive support (formed of steel and plated with nickel on the surface thereof) had a diameter of 6 mm and a length of 252 mm. Next, the unvulcanized rubber composition obtained as described above was coaxially extruded into a cylindrical shape together with the conductive support provided at the center thereof by extrusion molding using a crosshead, so that an unvulcanized rubber roller was formed in which the unvulcanized rubber composition was coated along the periphery of the conductive support. As an extruder, an extruder having a cylinder diameter of 45 mm and an L/D of 20 was used, and the temperature control for extrusion was performed so that the head temperature, the cylinder temperature, and the screw temperature were each set to 90 degrees Celsius. After the unvulcanized rubber roller thus molded was cut at both ends so that an elastic layer portion thereof had a width of 228 mm in the axial direction, a heating treatment was performed at a temperature of 160 degrees Celsius for 40 minutes using an electrical furnace, so that a vulcanized rubber roller was obtained.

The surface of the vulcanized rubber roller thus obtained was polished by a polishing machine of a plunge-cut polishing method, so that a rubber roller having a crown-shaped elastic layer was obtained in which the diameter of the end portion was 8.35 mm and the diameter of the central portion was 8.5 mm. A surface modification treatment was performed by irradiating the surface of the rubber roller thus obtained with ultraviolet irradiation. The surface treatment was performed so that the accumulated light amount of ultraviolet rays having a wavelength of 254 nm was 8,500 $mJ/cm^2$, and the irradiation of ultraviolet rays was performed using a low pressure mercury lamp manufactured by Hanson Toshiba Lighting Corporation. The charging roller 1 was formed as described above.

Measurement of MD-1 Hardness

For the measurement of the surface hardness of the charging roller 1, a micro hardness meter (trade name: MD-1, manufactured by Kobunshi Keiki Co., Ltd.) was used, and the measurement was performed at a temperature of 23 degrees Celsius and a relative humidity of 55% RH in a peak hold mode.

In more particular, after the charging member was placed on a metal plate and was fixed by simply placing a metal block so as not to be rolled away, a measurement terminal was pressed precisely on the center of the charging member in a direction perpendicular to the metal plate, and the value was read after 5 seconds passed. This measurement was performed at 3 positions in a circumferential direction at each of the central portion of the charging member and the two ends thereof 30 to 40 mm apart from the respective rubber end portions, so that 9 positions were measured. The average value of the measured values thus obtained was regarded as the hardness of the elastic layer, and the results thereof are shown in Table 6-1.

Measurement of Universal Hardness

The surface hardness of the charging roller 1 was measured using a universal harness meter (trade name: ultramicrohardness meter H-100V, manufactured by Fischer Corp.). As an indenter for the measurement, a square pyramid diamond was used. An indenting speed was determined by the following formula (2).

$$dF/dt = 1000\ \mathrm{mN}/240\ \mathrm{s} \quad (2)$$

(F indicates force, and t indicates time)

The maximum hardness at an indenting depth of 0 to 10 micrometer of the indenter was regarded as the surface hardness of the charging roller 1. In addition, the hardness at an indenting depth of 100 micrometer was regarded as the hardness of the inside of the elastic layer.

Degree of Swelling of Conductive Elastic Layer

The degree of swelling of the conductive elastic layer was measured by the following method. The results are shown in Table 6-1. As a measurement method, in accordance with JIS K6258, the conductive elastic layer was immersed in toluene for 24 hours at a room temperature of 23 degrees Celsius, and from the volume of the elastic layer before the immersion and the volume thereof after the immersion, the degree of swelling was calculated by the following formula (3).

A sample was formed by slicing a labor portion of the conductive elastic layer into an arc shape having a length of 20 mm and a thickness of 2 mm.

$$\text{Degree of Swelling (\%)} = 100 * ((\text{Volume after Immersion})/(\text{Volume before Immersion}) - 1) \quad (3)$$

Image Evaluation

The charging roller 1 was fitted to a process cartridge (in pressure contact with a photoconductor having a diameter of 30 mm at a load of 5 N applied to the two ends of the roller), and this process cartridge was left to stand still for 30 days at a temperature of 40 degrees Celsius and a relative humidity of 95%. Subsequently, this process cartridge was fitted to an electrophotographic apparatus (trade name: LBP5050, manufactured by CANON KABUSHIKI KAISHA), and a halftone image (an image in which one-dot-width transverse lines were drawn in a direction perpendicular to the rotation direction of the photoconductor at two-dot intervals) was output. In addition, the halftone image thus obtained was visually observed, and the evaluation thereof was performed based on the criteria shown in Table 3.

TABLE 3

| EVALUATION RANK | EVALUATION CRITERIA |
|---|---|
| A | NO STRIPES CAUSED BY C SET ARE OBSERVED. |
| B | SLIGHT STRIPES CAUSED BY C SET ARE OBSERVED. |
| C | SPARSE STRIPES CAUSED BY C SET ARE OBSERVED. |
| D | CLEAR STRIPES CAUSED BY C SET ARE OBSERVED. |
| E | DENSE STRIPES CAUSED BY C SET ARE OBSERVED. |

Measurement of Strain Amount

The charging roller 1 was taken out from the process cartridge used for the above image evaluation, and the amount of the C set of the charging roller generated at a pressure contact portion with the electrophotographic photoconductor was measured. In this measurement, the amount of the C set was defined as the strain amount obtained from the difference in outer shape between the pressure contact portion and a non-pressure contact portion. In this example, for this measurement, a laser dimension measuring device (trade name: LS-5500, manufactured by KEYENCE Corporation) was used.

Example 2

Except that the acrylonitrile butadiene rubber was changed to N250SL (content of acrylonitrile: 20%, manufactured by JSR Corp.), an elastic-layer rubber material was prepared in a manner similar to that of Example 1, and from the obtained unvulcanized rubber, a charging roller 2 was formed in a manner similar to that of Example 1.

Example 3

Except that the acrylonitrile butadiene rubber was changed to a rubber mixture shown in Table 4, an elastic-layer rubber material was prepared in a manner similar to that of Example 1, and from the obtained unvulcanized rubber, a charging roller 3 was formed in a manner similar to that of Example 1.

TABLE 4

| | |
|---|---|
| NBR (TRADE NAME: N230SV, MANUFACTURED BY JSR CORP.) | 40 PARTS BY MASS |
| SOLUTION POLYMERIZATION STYRENE-BUTADIENE RUBBER (SBR) (TRADE NAME: SL552, MANUFACTURED BY JSR CORP.) | 60 PARTS BY MASS |

Example 4

Except that the acrylonitrile butadiene rubber was changed to a rubber mixture shown in Table 5, an elastic-layer rubber material was prepared in a manner similar to that of Example 1, and from the obtained unvulcanized rubber, a charging roller 4 was formed in a manner similar to that of Example 1.

TABLE 5

| | |
|---|---|
| NBR (TRADE NAME: N230SV, MANUFACTURED BY JSR CORP.) | 40 PARTS BY MASS |
| BUTADIENE RUBBER (BR) (TRADE NAME: BR1220L, MANUFACTURED BY ZEON CORP.) | 60 PARTS BY MASS |

Example 5

Except that the amount of N,N'-methylenebis(1,4-phenylene)dimaleimide was changed to 5 parts by mass with respect to 100 parts by mass of the acrylonitrile butadiene rubber, an elastic-layer rubber material was prepared in a manner similar to that of Example 1, and from the obtained unvulcanized rubber, a charging roller 5 was formed in a manner similar to that of Example 1.

Example 6

Except that the ultraviolet irradiation of the polished charging roller was changed to electron beam irradiation thereof, an elastic-layer rubber material was prepared in a manner similar to that of Example 1, and from the obtained unvulcanized rubber, a charging roller 6 was formed in a manner similar to that of Example 1. For the electron beam irradiation, an electron beam irradiation device (manufactured by Iwasaki Electric Co., Ltd.) having a maximum accelerating voltage of 150 kV and a maximum electron current of 40 mA was used, and in the electron beam irradiation, a nitrogen gas purge was performed. As the process conditions, the accelerating voltage was set to 150 kV, the electron current was set to 2.5 mA, the process speed was set to 1 m/min, the oxygen concentration was set to 100 ppm, and the device constant K was set to 40. As described above, the charging roller 6 was obtained.

Example 7

Except that the polished charging roller was irradiated with electron beams under condition similar to those of Example 6, a charging roller 7 was obtained in a manner similar to that of Example 3.

Example 8

Except that the polished charging roller was irradiated with electron beams under condition similar to those of Example 6, a charging roller 8 was obtained in a manner similar to that of Example 4.

Example 9

Except that the ultraviolet irradiation of the polished charging roller was changed to hot-air oven heating thereof, a charging roller 9 was obtained in a manner similar to that of Example 1. The hot-air oven heating was performed at a temperature of 210 degrees Celsius for 15 minutes.

Example 10

Except that when the unvulcanized rubber composition was molded by extrusion using a crosshead, the core-metal feed speed was adjusted to form an unvulcanized rubber roller having crown shaped elastic layer in which the end diameter was 8.4 mm and the central diameter was 8.5 mm, and that polishing was not performed, a charging roller 10 was obtained in a manner similar to that of Example 1.

Example 11

Except that the ultraviolet irradiation was not performed, a charging roller 11 was obtained in a manner similar to that of Example 10.

Comparative Example 1

Except that N,N'-methylenebis(1,4-phenylene)dimaleimide was not added, a charging roller 12 was obtained in a manner similar to that of Example 1.

Comparative Example 2

Except that N,N'-methylenebis(1,4-phenylene)dimaleimide was not added, a charging roller 13 was obtained in a manner similar to that of Example 6.

Comparative Example 3

Except that N,N'-methylenebis(1,4-phenylene)dimaleimide was not added, a charging roller 14 was obtained in a manner similar to that of Example 9.

Evaluation results of Examples 1 to 11 and Comparative Examples 1 to 3 are shown in Tables 6-1 and 6-2.

TABLE 6-1

| | | EXAMPLE | | | | | | | | | | |
|---|---|---|---|---|---|---|---|---|---|---|---|---|
| | | 1 | 2 | 3 | 4 | 5 | 6 | 7 | 8 | 9 | 10 | 11 |
| NBR (N230SV) | (CONTENT OF ACRYLONITRILE = 35%) | 100 | — | 40 | 40 | 100 | 100 | 40 | 40 | 100 | 100 | 100 |
| NBR (N250SL) | (CONTENT OF ACRYLONITRILE = 20%) | — | 100 | — | — | — | — | — | — | — | — | — |
| SBR (SL552) | — | — | — | 60 | — | — | — | 60 | — | — | — | — |
| SBR (BR1220L) | — | — | — | — | 60 | — | — | | 60 | — | — | — |
| CARBON BLACK | | 30 | 30 | 30 | 30 | 30 | 30 | 30 | 30 | 30 | 30 | 30 |
| ZINC OXIDE | | 5 | 5 | 5 | 5 | 5 | 5 | 5 | 5 | 5 | 5 | 5 |
| ZINC STEARATE | | 1 | 1 | 1 | 1 | 1 | 1 | 1 | 1 | 1 | 1 | 1 |
| CALCIUM CARBONATE | | 20 | 20 | 20 | 20 | 20 | 20 | 20 | 20 | 20 | 20 | 20 |
| N,N'-METHYLENEBIS(1,4-PHENYLENE) DIMALEIMIDE | | 3 | 3 | 3 | 3 | 3 | 3 | 3 | 3 | 3 | 3 | 3 |
| SULFUR | | 1.2 | 1.2 | 1.2 | 1.2 | 1.2 | 1.2 | 1.2 | 1.2 | 1.2 | 1.2 | 1.2 |
| NOCCELER TBzTD | | 4.5 | 4.5 | 4.5 | 4.5 | 4.5 | 4.5 | 4.5 | 4.5 | 4.5 | 4.5 | 4.5 |
| ELECTRON BEAM IRRADIATION | | NO | NO | NO | NO | NO | YES | YES | YES | NO | NO | NO |
| ULTRAVIOLET IRRADIATION | | YES | YES | YES | YES | YES | NO | NO | NO | NO | YES | NO |
| HEAT TREATMENT (210° C., 15 MINUTES) | | NO | NO | NO | NO | NO | NO | NO | NO | YES | NO | NO |
| POLISHING TREATMENT | | YES | YES | YES | YES | YES | YES | YES | YES | YES | NO | NO |
| MD-1 HARDNESS (°) | | 64 | 63 | 64 | 66 | 67 | 71 | 74 | 75 | 69 | 66 | 64 |
| UNIVERSAL HARDNESS ($N/mm^2$) | SURFACE | 8.5 | 8.8 | 7.6 | 7.1 | 9.9 | 13.5 | 11.5 | 12.5 | 10.7 | 8.0 | 6.7 |
| | INSIDE | 1.0 | 0.8 | 0.9 | 1.1 | 3.5 | 1.5 | 2.0 | 1.8 | 2.9 | 1.3 | 1.2 |
| | DIFFERENCE IN HARDNESS | 7.5 | 8.0 | 6.7 | 6.0 | 6.4 | 12.0 | 9.5 | 10.7 | 7.8 | 6.7 | 5.5 |
| DEGREE OF SWELLING IN TOLUENE (%) | | 121 | 139 | 124 | 131 | 121 | 130 | 128 | 134 | 146 | 146 | 135 |
| IMAGE EVALUATION | C SET IMAGE | B | B | B | B | B | A | A | A | B | B | C |
| | STRAIN AMOUNT (μm) | 4.2 | 4.8 | 4.3 | 4.6 | 3.9 | 3.2 | 3.8 | 3.6 | 3.9 | 3.9 | 4.9 |

TABLE 6-2

| | | COMPARATIVE EXAMPLE | | |
|---|---|---|---|---|
| | | 1 | 2 | 3 |
| NBR (N230SV) | (CONTENT OF ACRYLONITRILE = 35%) | 100 | 100 | 100 |
| NBR (N250SL) | (CONTENT OF ACRYLONITRILE = 20%) | — | — | — |
| SBR (SL552) | — | — | — | — |
| SBR (BR1220L) | — | — | — | — |
| CARBON BLACK | | 30 | 30 | 30 |
| ZINC OXIDE | | 5 | 5 | 5 |
| ZINC STEARATE | | 1 | 1 | 1 |
| CALCIUM CARBONATE | | 20 | 20 | 20 |
| N,N'-METHYLENEBIS(1,4-PHENYLENE)DIMALEIMIDE | | — | — | — |
| SULFUR | | 1.2 | 1.2 | 1.2 |
| NOCCELER TBzTD | | 4.5 | 4.5 | 4.5 |
| ELECTRON BEAM IRRADIATION | | NO | YES | NO |
| ULTRAVIOLET IRRADIATION | | YES | NO | NO |
| HEAT TREATMENT (210° C., 15 MINUTES) | | NO | NO | YES |
| POLISHING TREATMENT | | YES | YES | YES |
| MD-1 HARDNESS (°) | | 65 | 73 | 68 |
| UNIVERSAL | SURFACE | 2.5 | 4.0 | 3.4 |
| HARDNESS | INSIDE | 1.5 | 2.0 | 1.9 |
| ($N/mm^2$) | DIFFERENCE IN HARDNESS | 1.0 | 2.0 | 1.5 |
| DEGREE OF SWELLING IN TOLUENE (%) | | 155 | 186 | 164 |
| IMAGE EVALUATION | C SET IMAGE | E | D | D |
| | STRAIN AMOUNT (μm) | 9.7 | 8.9 | 9.4 |

As apparent from Tables 6-1 and 6-2, it is found that in Comparative Examples 1 to 3, the degree of swelling in toluene is high, the amount of compression set is high, the hardness of the surface of the charging roller is low, and the C set image is inferior.

Since Examples 1 to 11 are in the range of the present invention, the degree of swelling in toluene is low, the amount of compression set is low, and the C set image of each Example is ranked at the level C or more; hence, an excellent image having no practical problems is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-176754, filed Aug. 12, 2011, which is hereby incorporated by reference herein in its entirety.

REFERENCE SIGNS LIST charging roller
11 core metal
12 elastic layer
13 surface layer

The invention claimed is:

1. A charging member comprising
a conductive elastic layer,
wherein
said elastic layer is formed by vulcanizing a layer of an unvulcanized rubber composition including
an unvulcanized acrylonitrile butadiene rubber, and N,N'-methylenebis(1,4-phenylene)dimaleimide.

2. The charging member according to claim 1, wherein:
said elastic layer is formed by further irradiating a surface of the layer of the rubber composition with electron beams.

3. The charging member according to claim 1, wherein:
said elastic layer further includes an electron conductive filler.

4. An electrophotographic apparatus comprising:
charging member according to claim 1; and
an electrophotographic photoconductor.

* * * * *